United States Patent
Yabe et al.

(10) Patent No.: US 10,348,145 B2
(45) Date of Patent: Jul. 9, 2019

(54) ROTOR, ELECTRIC MOTOR, COMPRESSOR, AND BLOWER

(71) Applicant: Mitsubishi Electric Corporation, Tokyo (JP)

(72) Inventors: Koji Yabe, Tokyo (JP); Kazuhiko Baba, Tokyo (JP); Takahiro Tsutsumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 145 days.

(21) Appl. No.: 15/307,097

(22) PCT Filed: Jul. 1, 2014

(86) PCT No.: PCT/JP2014/067575
§ 371 (c)(1),
(2) Date: Oct. 27, 2016

(87) PCT Pub. No.: WO2016/002012
PCT Pub. Date: Jan. 7, 2016

(65) Prior Publication Data
US 2017/0047802 A1     Feb. 16, 2017

(51) Int. Cl.
| | |
|---|---|
| *H02K 1/32* | (2006.01) |
| *H02K 17/04* | (2006.01) |
| *H02K 17/16* | (2006.01) |

(52) U.S. Cl.
CPC .............. *H02K 1/32* (2013.01); *H02K 17/04* (2013.01); *H02K 17/16* (2013.01); *H02K 17/165* (2013.01); *H02K 2213/03* (2013.01)

(58) Field of Classification Search
CPC ........ H02K 1/32; H02K 17/165; H02K 17/04; H02K 17/16; H02K 2213/03
(Continued)

(56) References Cited

U.S. PATENT DOCUMENTS

| 3,997,803 A | 12/1976 | Mishra |
| 5,986,366 A * | 11/1999 | Bailey ..................... H02K 1/28 |
| | | 310/211 |

(Continued)

FOREIGN PATENT DOCUMENTS

| EP | 2299565 A1 | 3/2011 |
| EP | 2 199 615 A3 | 1/2015 |

(Continued)

OTHER PUBLICATIONS

Office action dated Apr. 28, 2018 issued in corresponding CN patent application No. 201480079362.2 (and English translation thereof).
(Continued)

*Primary Examiner* — John K Kim
(74) *Attorney, Agent, or Firm* — Posz Law Group, PLC

(57) ABSTRACT

A rotor is connected to a shaft member and rotates about a central axis. The rotor includes a shaft hole having at least part of the shaft member disposed therein; and flow paths disposed around the shaft member and penetrating the rotor in a direction parallel with the central axis. Each flow path has a first surface facing outward in the radial direction; a second surface disposed outward of the first surface in the radial direction and facing the first surface; a third surface connecting the first and second surfaces at one end in a rotational direction about the central axis; a fourth surface connecting the first and second surfaces at the other end in the rotational direction. The condition C<D is satisfied, where C is the distance between both ends of the first surface, and D is the distance between both ends of the second surface.

19 Claims, 15 Drawing Sheets

(58) Field of Classification Search
USPC .................................................. 310/54, 61
See application file for complete search history.

(56) References Cited

U.S. PATENT DOCUMENTS

| | | | |
|---|---|---|---|
| 8,740,584 B2 | 6/2014 | Yoshino et al. | |
| 2011/0081263 A1* | 4/2011 | Yoshino | F04C 23/008 417/410.1 |
| 2012/0169158 A1 | 7/2012 | Büttner et al. | |
| 2013/0020898 A1* | 1/2013 | Ryu | H02K 1/276 310/156.56 |
| 2017/0047802 A1* | 2/2017 | Yabe | H02K 1/32 |

FOREIGN PATENT DOCUMENTS

| | | |
|---|---|---|
| JP | S51-8407 U | 1/1976 |
| JP | S55-158643 U | 11/1980 |
| JP | S56-71441 A | 6/1981 |
| JP | S59-23261 U | 2/1984 |
| JP | S60-114555 U | 8/1985 |
| JP | S60-160047 U | 10/1985 |
| JP | S61-7239 U | 1/1986 |
| JP | S63-245239 A | 10/1988 |
| JP | S63-198349 U | 12/1988 |
| JP | H01-40295 Y2 | 12/1989 |
| JP | H01-45235 Y2 | 12/1989 |
| JP | 2000-350415 A | 12/2000 |
| JP | 2004-041000 A | 2/2004 |
| JP | 2008-086164 A | 4/2008 |
| JP | 2010-144635 A | 7/2010 |
| WO | 2010/016106 A1 | 2/2010 |
| WO | 2014/072263 A2 | 5/2014 |

OTHER PUBLICATIONS

Office Action dated Jun. 20, 2017 issued in corresponding JP patent application No. 2016-530732 (and partial English translation).
International Search Report of the International Searching Authority dated Sep. 16, 2014 for the corresponding International application No. PCT/JP2014/067575 (and English translation).
Extended European Search Report dated Jan. 4, 2018 issued in corresponding EP patent application No. 14896857.1.
Office Action dated Dec. 14, 2018 issued in corresponding CN patent application No. 201480079362.2 (and English translation).
Office Action dated Jan. 31, 2019 issued in corresponding IN patent application No. 201647038562.

* cited by examiner

ROTOR, ELECTRIC MOTOR, COMPRESSOR, AND BLOWER

CROSS REFERENCE TO RELATED APPLICATION

This application is a U.S. national stage application of International Patent Application No. PCT/JP2014/067575 filed on Jul. 1, 2014, the disclosure of which is incorporated herein by reference.

TECHNICAL FIELD

The present invention relates to a rotor, an electric motor, a compressor, and a blower.

BACKGROUND

Compressors and blowers operate using power generated by electric motors. Induction motors including a stator that generates a rotating magnetic field and a rotor that is rotated by an electromagnetic force from an induced current generated by the rotating magnetic field, as disclosed in Patent Literature 1 and Patent Literature 2, are known.

PATENT LITERATURE

Patent Literature 1: International Publication WO 2010/016106

Patent Literature 2: Japanese Patent Application Laid-Open No. 2010-144635

In some cases, a rotor has flow paths referred to as air holes. A fluid, such as a refrigerant, flows along the flow paths. Depending on the structure of the flow paths, magnetic saturation may occur in the rotor. If magnetic saturation occurs, the efficiency of the electric motor may be reduced.

SUMMARY

An object of the present invention is to provide a rotor, an electric motor, a compressor, and a blower that can suppress a reduction in efficiency.

An aspect of the present invention is a rotor that is connected to a shaft member, rotates about a central axis, and is used for an electric motor, the rotor including: a shaft hole in which at least a part of the shaft member that rotates about the central axis is disposed; and a plurality of flow paths disposed around the shaft member and penetrating the rotor in a direction parallel with the central axis, wherein each of the flow paths has an inner surface including: a first surface facing outward in a radial direction of the shaft member; a second surface disposed outward of the first surface in the radial direction and facing the first surface with a clearance between the first surface and the second surface; a third surface connecting one end of the first surface and one end of the second surface in a rotational direction about the central axis; and a fourth surface connecting another end of the first surface and another end of the second surface in the rotational direction, and a condition C<D is satisfied, where a distance from the one end of the first surface to the another end of the first surface is C, and a distance from the one end of the second surface to the another end of the second surface is D.

The present invention provides a rotor, an electric motor, a compressor, and a blower that can suppress a reduction in efficiency.

DETAILED DESCRIPTION

Exemplary embodiments of the present invention will now be described with reference to the drawings.

First Embodiment.

Figure 1:
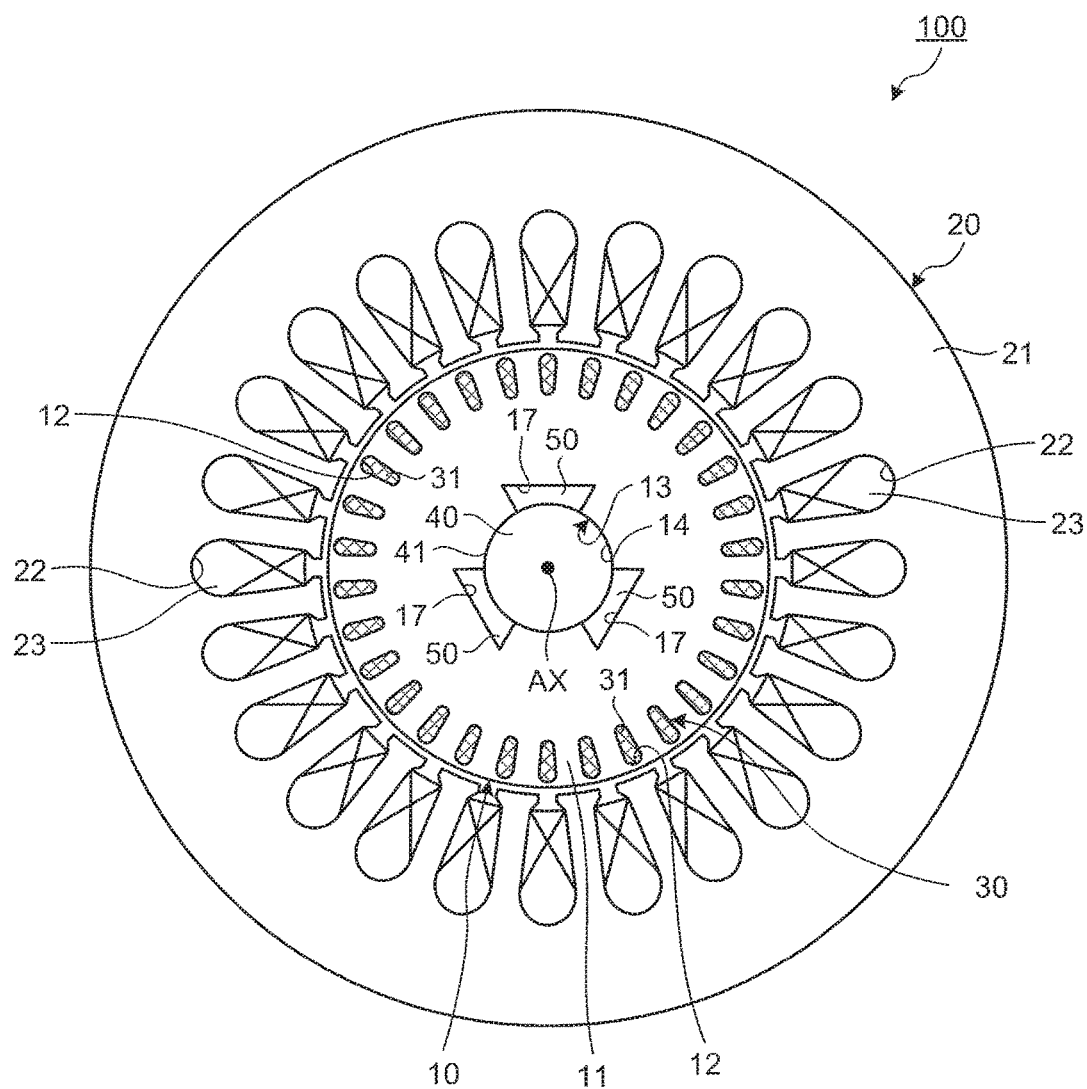
FIG. 1 is a sectional view illustrating an exemplary electric motor according to a first embodiment.
Figure 2:
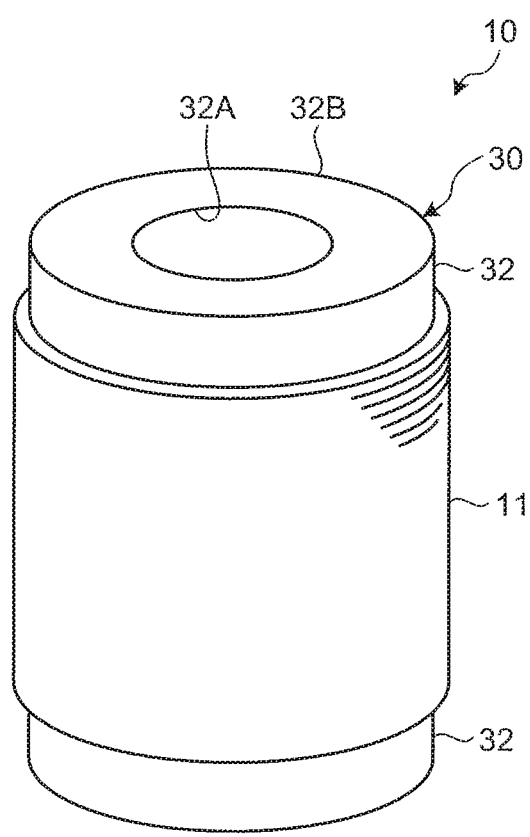
FIG. 2 is a perspective view illustrating an exemplary rotor according to the first embodiment.
Figure 3:
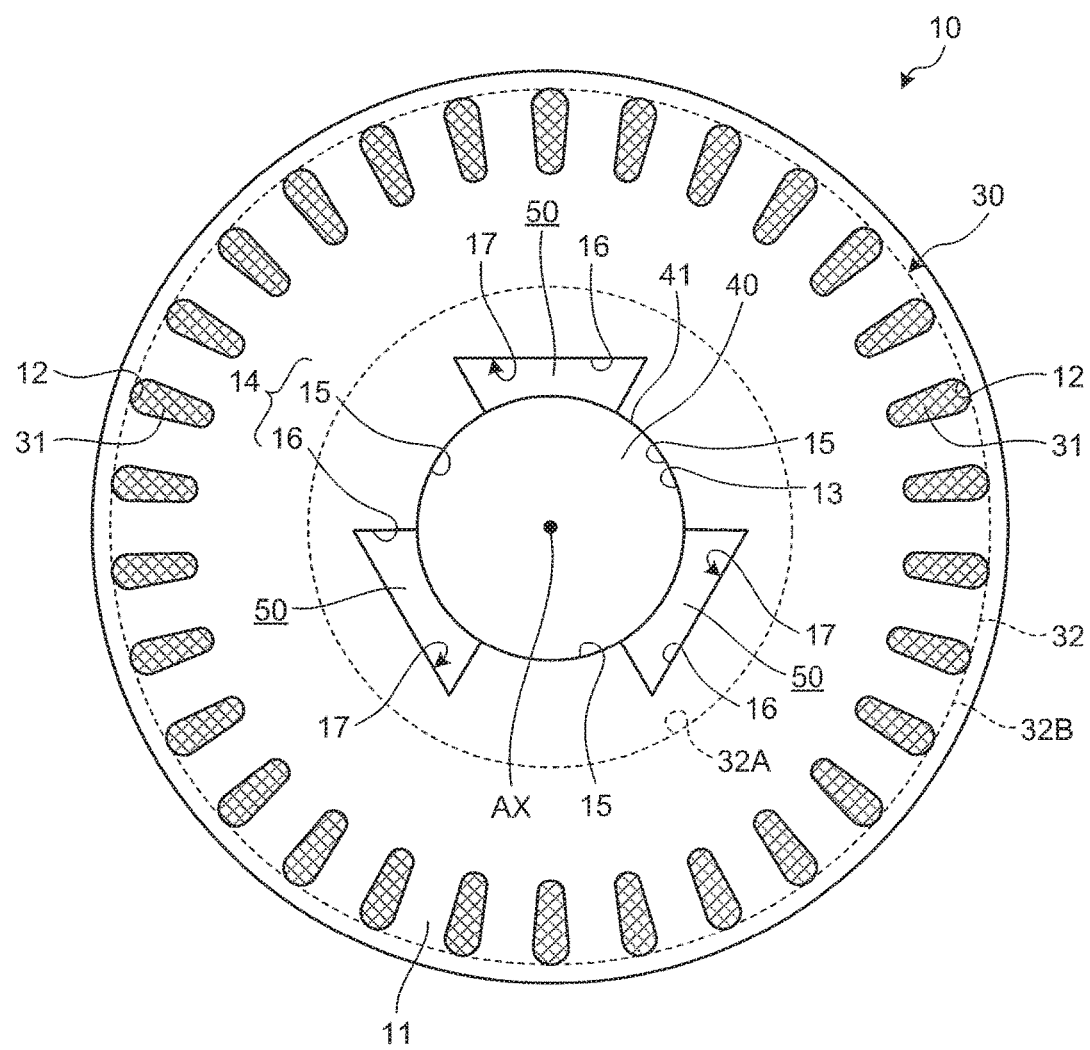
FIG. 3 is a plan view illustrating the exemplary rotor according to the first embodiment.
Figure 4:
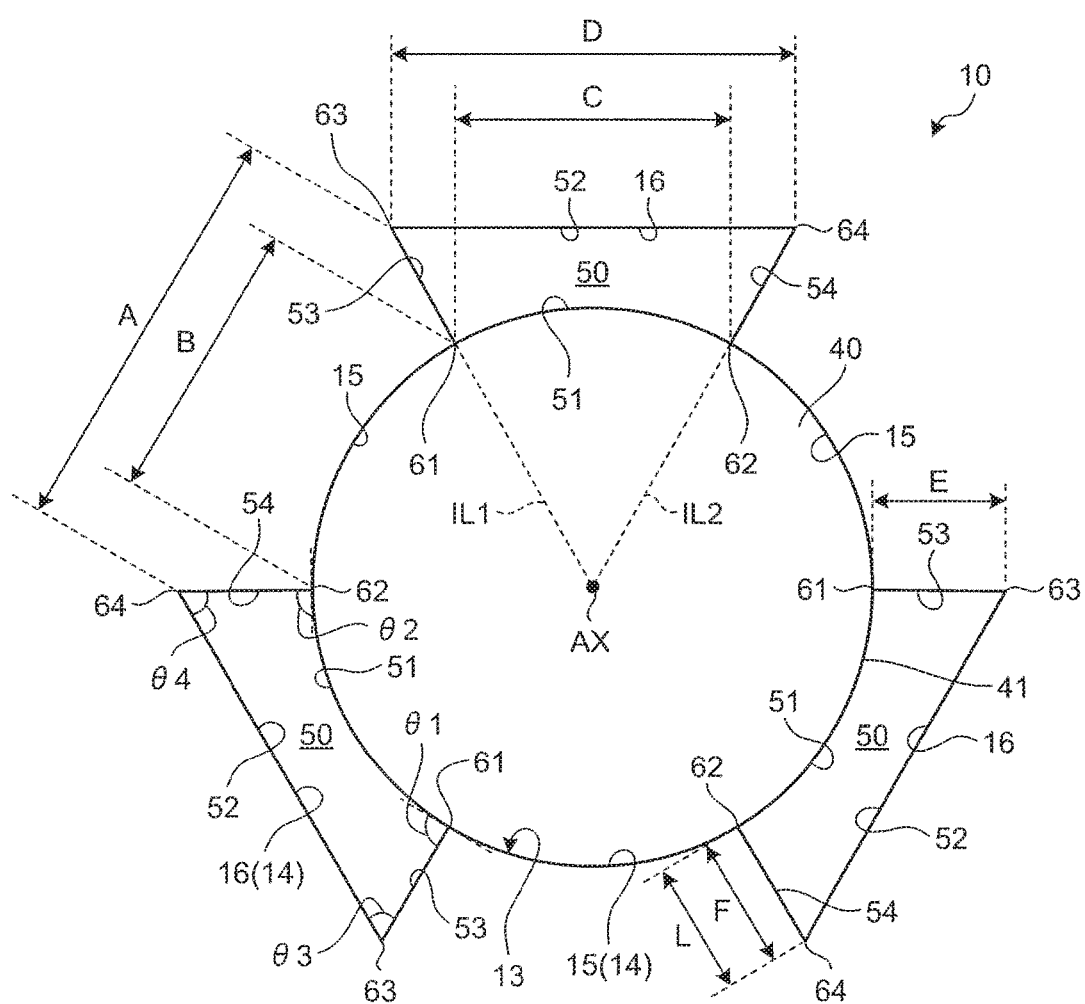
FIG. 4 is a partial enlarged view of FIG. 3.
Figure 5:
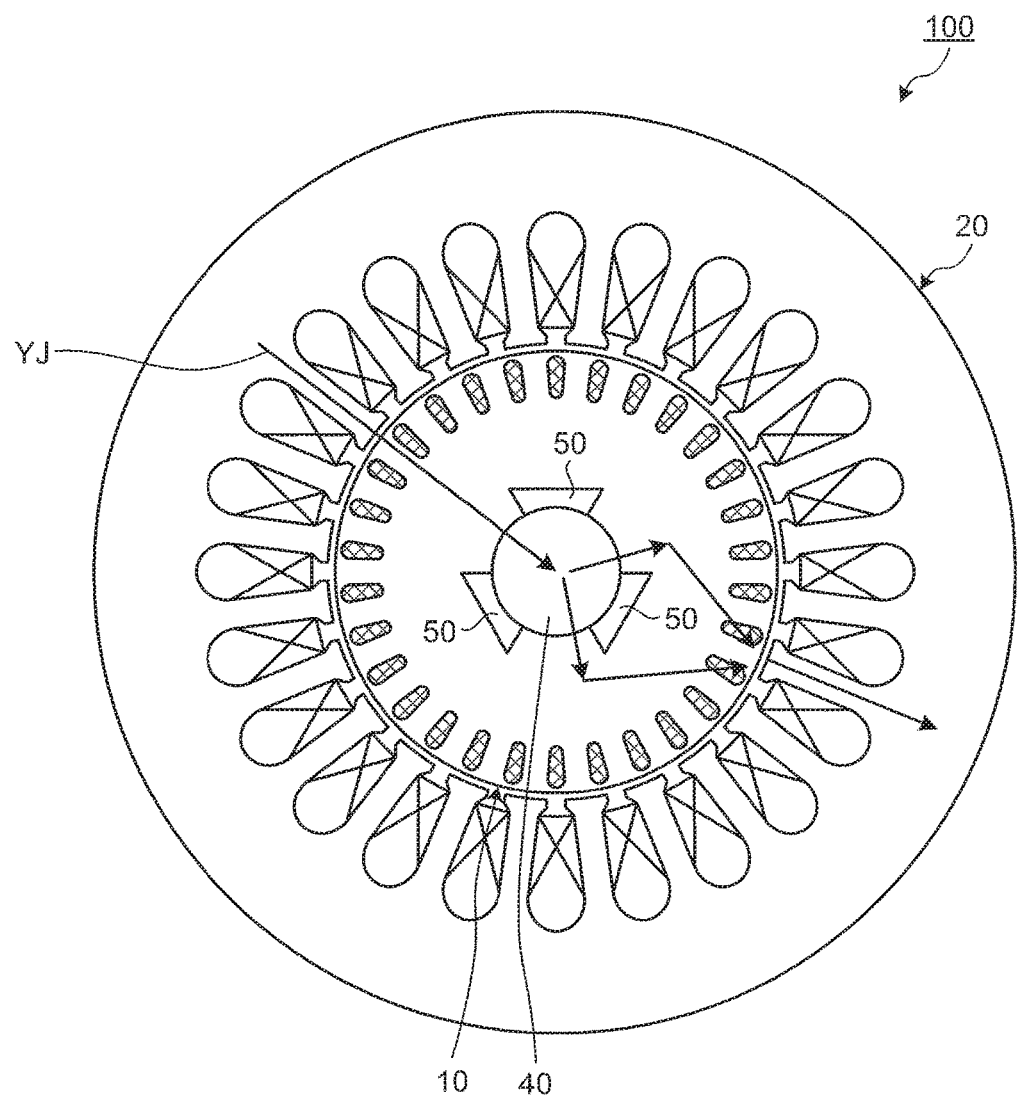
FIG. 5 is a diagram illustrating the flow of magnetic flux in the electric motor.

FIG. 1 is a sectional view illustrating an exemplary electric motor 100. FIG. 2 is a perspective view illustrating an exemplary rotor 10 of the electric motor 100. FIG. 3 is a plan view illustrating the exemplary rotor 10 of the electric motor 100. FIG. 4 is a partial enlarged view of FIG. 3. FIG. 5 is a diagram illustrating the flow of magnetic flux in the electric motor 100.

The electric motor 100 is a two-pole induction motor. The electric motor 100 includes the rotor 10, which is connected to a shaft member 40 and rotates about a central axis AX, and a stator 20 disposed around the rotor 10. The rotor 10 is disposed in a space inside the stator 20. An outer surface of the rotor 10 faces an inner surface of the stator 20 with a clearance therebetween.

The stator 20 includes a stator core 21, which has stator slots 22, and coils 23, which are disposed in the stator slots 22.

The stator core 21 is a tubular member. The stator core 21 is a stack of magnetic steel sheets. The stator core 21 is fabricated by fixing the magnetic steel sheets stacked in an axial direction.

A plurality of stator slots 22 are formed in the stator core 21. The stator slots 22 are disposed with intervals therebetween in a rotational direction.

Each of the stator slots 22 has an opening that faces the space inside the stator core 21. The opening of each of the stator slots 22 is referred to as a slot opening. The coil 23 is inserted in each of the stator slots 22 from the slot opening.

A plurality of coils 23 are disposed in the stator slots 22. With an alternating current supplied to the coils 23, the stator 20 generates a rotating magnetic field.

The rotor 10 generates an induced current due to the rotating magnetic field generated by the stator 20 and is thus rotated by the electromagnetic force of the induced current. The rotor 10 includes a shaft hole 13, in which at least a part of the shaft member 40 that rotates about the central axis AX is disposed; a rotor core 11, which is disposed around the shaft member 40 and connected to an outer surface 41 of the shaft member 40; a plurality of flow paths 50, which are disposed around the shaft member 40 and penetrate the rotor 10 in a direction parallel with the central axis AX; and a squirrel-cage conductor 30, which is connected to the rotor core 11.

The rotor core 11 is a tubular member. The rotor core 11 is a stack of magnetic steel sheets. The rotor core 11 is fabricated by fixing the magnetic steel sheets stacked in the axial direction.

The rotor core 11 has rotor slots 12 and the shaft hole 13. The shaft hole 13 is formed in the rotor core 11 at the center of the rotor core 11 on a plane orthogonal to the central axis AX. The shaft member 40 is connected to an inner surface 14 of the shaft hole 13. The shaft member 40 disposed in the shaft hole 13 is fixed to the rotor core 11. A plurality of rotor slots 12 are formed around the shaft hole 13. The rotor slots 12 are disposed in a rotational direction with intervals therebetween about the central axis AX.

The shaft member 40 is fixed to the rotor core 11. The central axis AX of the shaft member 40 coincides with the central axis AX of the rotor 10. One end and the other end of the shaft member 40, as viewed in a direction parallel with the central axis AX, are disposed outside the rotor core 11. The shaft member 40 is rotatably supported by a bearing. The outside shape of the shaft member 40 is circular on a plane orthogonal to the central axis AX.

A direction parallel with the central axis AX is referred to as an axial direction, a rotational direction about the central axis AX is referred to as a rotational direction, and a radial direction of the shaft member 40 is referred to as a radial direction, as appropriate hereinafter. The radial direction includes a radiating direction of the central axis AX.

The squirrel-cage conductor 30 includes rotor bars 31, which are nonmagnetic and conductive and disposed in the rotor slots 12 of the rotor core 11, and end rings 32, which are connected to the rotor bars 31.

A plurality of rotor bars 31 are disposed around the central axis AX. The rotor bars 31 are formed of a nonmagnetic and conductive material, such as aluminum or copper. The rotor bars 31 are fabricated by filling the rotor slots 12 with the nonmagnetic and conductive material.

The end rings 32 are connected to the ends of the rotor bars 31. The end ring 32 has an inner edge portion 32A, which faces the central axis AX, and an outer edge portion 32B, which is located outside the inner edge portion 32A in the radial direction. The end ring 32 is disposed on both ends of the rotor bars 31. The ends of the rotor bars 31 are short-circuited by the end rings 32.

The inner surface 14 of the shaft hole 13 has a connection region 15, which is connected to the outer surface 41 of the shaft member 40, and a non-connection region 16, which is disposed with a clearance between the outer surface 41 of the shaft member 40 and the non-connection region 16. The rotor 10 has recessed portions 17 formed in the inner surface 14 of the shaft hole 13. The recessed portions 17 are recessed from the inner surface 14 of the shaft hole 13 outward in the radial direction. The non-connection region 16 includes an inner surface of the recessed portions 17. The shaft member 40 is supported by the connection region 15 of the shaft hole 13.

The plurality of flow paths 50 are disposed around the shaft member 40 at intervals. In the present embodiment, the number of the flow paths 50 is three and they are disposed around the shaft member 40. The flow paths 50 penetrate the rotor 10 in the axial direction. Each of the flow paths 50 connects a first opening formed in one end surface of the rotor 10 in the axial direction and a second opening formed in the other end surface of the rotor 10 in the axial direction. The first opening is located at one end of each of the flow paths 50 in the axial direction, and the second opening is located at the other end of the corresponding one of the flow paths 50 in the axial direction. The first opening and the second opening of each of the flow paths 50 are disposed between the outer surface 41 of the shaft member 40 and the inner edge portion 32A of the end rings 32 on a plane orthogonal to the central axis AX.

A fluid flows through the flow paths 50. The fluid enters the flow paths 50 from the first openings, flows through the flow paths 50, and then exits from the second openings. The fluid that flows through the flow paths 50 includes one or both of a gas and a liquid. The fluid that flows through the flow paths 50 includes a refrigerant, air, a gas, and oil. For example, a refrigerant flows through the flow paths 50 to cool down the rotor 10. The flow paths 50 may be referred to as air holes.

Each of the flow paths 50 has an inner surface that includes a first surface 51, which faces outward in the radial direction; a second surface 52, which is disposed outward of the first surface 51 in the radial direction and faces the first surface 51 with a clearance therebetween; a third surface 53, which connects one end of the first surface 51 and one end of the second surface 52 in the rotational direction; and a fourth surface 54, which connects the other end of the first surface 51 and the other end of the second surface 52 in the rotational direction.

The flow paths 50 are formed between the shaft member 40 and the rotor core 11. Each of the flow paths 50 is defined by the outer surface 41 of the shaft member 40 and the non-connection region 16 of the rotor core 11. The first surfaces 51 are located on the shaft member 40. The second surfaces 52, the third surfaces 53, and the fourth surfaces 54 are located on the rotor core 11. The outer surface 41 of the shaft member 40 includes the first surfaces 51. The non-connection region 16 of the rotor core 11 includes the second surfaces 52, the third surfaces 53, and the fourth surfaces 54.

The inner surface of each of the flow paths 50 including the first surface 51, the second surface 52, the third surface 53, and the fourth surface 54 is parallel with the central axis AX. The first surface 51 includes a curved surface. The second surface 52 is a flat surface. The third surface 53 is a flat surface. The fourth surface 54 is a flat surface. The first surface 51 includes the curved surface projecting outward in the radial direction.

Each of the flow paths 50 includes a first corner 61, which connects the first surface 51 and the third surface 53; a second corner 62, which connects the first surface 51 and the fourth surface 54; a third corner 63, which connects the second surface 52 and the third surface 53; and a fourth corner 64, which connects the second surface 52 and the fourth surface 54.

The first corner 61 is located between the one end of the first surface 51 in the rotational direction and an inward end of the third surface 53 in the radial direction. The second corner 62 is located between the other end of the first surface 51 in the rotational direction and an inward end of the fourth surface 54 in the radial direction. The third corner 63 is located between the one end of the second surface 52 in the rotational direction and an outward end of the third surface 53 in the radial direction. The fourth corner 64 is located between the other end of the second surface 52 in the rotational direction and an outward end of the fourth surface 54 in the radial direction.

Each of the flow paths 50 satisfies the condition in expression (1).

$$C<D \tag{1},$$

where the distance from the one end of the first surface 51 to the other end of the first surface 51 is C, and the distance from the one end of the second surface 52 to the other end of the second surface 52 is D on a plane orthogonal to the central axis AX.

The distance C is a direct distance from the one end of the first surface 51 to the other end of the first surface 51. The distance D is a direct distance from the one end of the second surface 52 to the other end of the second surface 52.

Each of the flow paths 50 satisfies the condition in expression (2).

$$E=F \tag{2},$$

where the distance from the inward end of the third surface 53 to the outward end of the third surface 53 is E, and the distance from the inward end of the fourth surface 54 to the outward end of the fourth surface 54 is F on a plane orthogonal to the central axis AX.

The distance E is a direct distance from the inward end of the third surface 53 to the outward end of the third surface 53. The distance F is a direct distance from the inward end of the fourth surface 54 to the outward end of the fourth surface 54.

Each of the flow paths 50 satisfies the condition in expression (3).

$$L<C \tag{3},$$

where the distance from the first surface 51 to the second surface 52 in the radial direction is L. In the present embodiment, the distance L is equal to the distance E and the distance F.

On a plane orthogonal to the central axis AX, a first imaginary line IL1, which connects the third corner 63 and the central axis AX, coincides with the third surface 53, and a second imaginary line IL2, which connects the fourth corner 64 and the central axis AX, coincides with the fourth surface 54. On a plane orthogonal to the central axis AX, an imaginary line connecting the central axis AX, the third corner 63, and the fourth corner 64 forms an isosceles triangle. Distances from the third surface 53 to the fourth surface 54 increase as the surfaces are located farther outward in the radial direction.

An angle θ1, which is formed by the first surface 51 and the third surface 53, is substantially 90 degrees. An angle θ2, which is formed by the first surface 51 and the fourth surface 54, is substantially 90 degrees. The angle θ1 is equal to the angle θ2. An angle θ3, which is formed by the second surface 52 and the third surface 53, is less than 90 degrees, i.e., this angle is an acute angle. An angle θ4, which is formed by the second surface 52 and the fourth surface 54, is less than 90 degrees, i.e., this angle is an acute angle. The angle θ3 is equal to the angle θ4.

The three flow paths 50 are disposed around the shaft member 40 at identical intervals. A part of the rotor core 11 is located between adjacent ones of the flow paths 50. One of two adjacent ones of the flow paths 50 is referred to as a first flow path 50, and the other one that is adjacent to the first flow path 50 is referred to as a second flow path 50, as appropriate hereinafter.

Each of the flow paths 50 satisfies expression (4).

$$A≥B \tag{4},$$

where the distance from the third corner 63 of the first flow path 50 to the fourth corner 64 of the second flow path 50 is A, and the distance from the first corner 61 of the first flow path 50 to the second corner 62 of the second flow path 50 is B.

The distance A is a direct distance from the third corner 63 of the first flow path 50 to the fourth corner 64 of the second flow path 50. The distance B is a direct distance from the first corner 61 of the first flow path 50 to the second corner 62 of the second flow path 50.

In the present embodiment, the distance A is equal to the distance D. The distance B is equal to the distance C.

As illustrated in FIG. 5, magnetic flux generated in the stator 20 passes through the rotor 10. As indicated by an arrow YJ, the magnetic flux generated in the stator 20 passes through the shaft member 40 disposed at the center of the rotor 10. In the present embodiment, the number of poles of the stator 20 is two. The number of magnetic fluxes generated in the two-pole stator 20 and passing through the shaft member 40 is larger than the number of magnetic fluxes generated in, for example, a four-pole or six-pole stator and passing through the shaft member 40. Additionally, the magnetic flux generated in, for example, a four-pole or six-pole stator is dispersed in accordance with the number of poles, whereas the magnetic flux of a two-pole stator is not dispersed and thus has a high magnetic flux density.

Having a short distance from the first flow path 50 to the second flow path 50, which is adjacent to the first flow path 50, may result in magnetic saturation. If magnetic saturation occurs, the efficiency of the electric motor 100 may be reduced. Magnetic saturation is a phenomenon in which the increase in magnetic flux density of the rotor 10 slows down while the magnetic force of the magnetic field generated in the stator 20 is increased. The efficiency of the electric motor 100 refers to the ratio of the electric power input to the electric power output.

Figure 6:
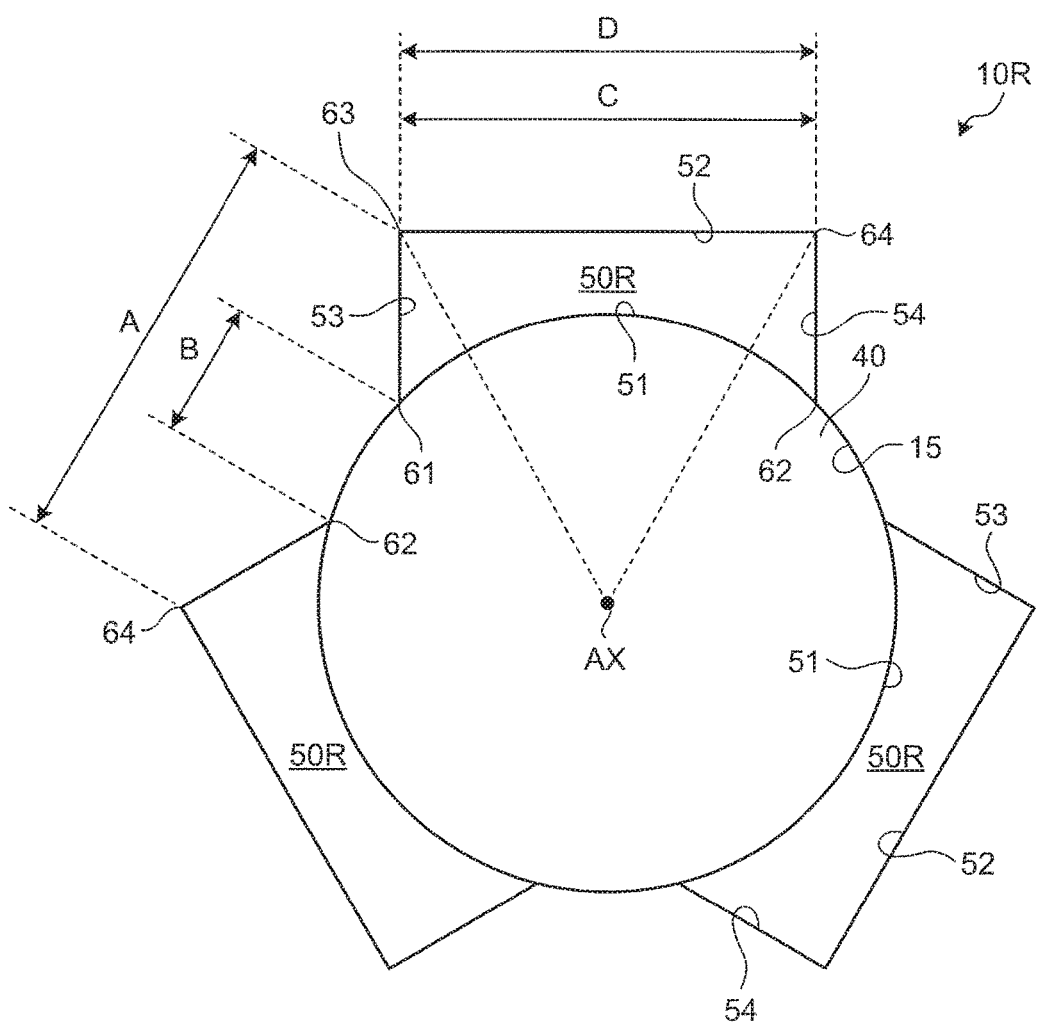
FIG. 6 is a plan view illustrating an example of a conventional rotor.

FIG. 6 is a diagram illustrating an example of a conventional rotor 10R. As illustrated in FIG. 6, if the distance C from one end of the first surface 51 to the other end of the first surface 51 is large and thus does not satisfy the condition in expression (1), then the result is that the distance B from the first corner 61 of a first flow path 50R to the second corner 62 of a second flow path 50R on a plane orthogonal to the central axis AX is short. A short distance B causes magnetic saturation, thereby reducing the efficiency of the electric motor.

The flow paths 50 according to the present embodiment satisfy the condition in expression (1). Hence, the distance B from the first flow path 50 to the second flow path 50 is increased. For example, the distance B is longer than a half of the distance A. When the distance B is long, the occurrence of magnetic saturation is inhibited. Inhibiting the occurrence of magnetic saturation suppresses a reduction in efficiency of the electric motor 100.

The flow paths 50 according to the present embodiment satisfy the condition in expression (3). That is, the shape of each of the flow paths 50 is elongated in the rotational direction on a plane orthogonal to the central axis AX. This increases the flow path area of each of the flow paths 50, thereby allowing a fluid to flow through the flow paths 50 smoothly. The flow path area of each of the flow paths 50 refers to the area of each of the flow paths 50 on a plane orthogonal to the central axis AX. When the flow paths 50 satisfy both of the conditions in expression (1) and expression (3), the smooth flow of a fluid through the flow paths 50 and inhibition of the occurrence of magnetic saturation are both achieved. This suppresses a reduction in efficiency of the electric motor 100.

Additionally, in the present embodiment, the first surface 51 of each of the flow paths 50 is located on the shaft member 40; and the second surface 52, the third surface 53, and the fourth surface 54 of each of the flow paths 50 are located on the rotor core 11. That is, each of the flow paths 50 is defined by the shaft member 40, which is supported in the shaft hole 13, and the recessed portions 17 disposed at the shaft hole 13 in the rotor core 11. In this manner, the flow paths 50 having large flow path areas are disposed at positions near the central axis AX. The speed of the flow paths 50 is reduced as the flow paths 50 are located closer to the central axis AX. Hence, a fluid can flow through the flow paths 50 smoothly during the rotation of the rotor 10.

Furthermore, in the present embodiment, each of the flow paths 50 includes the first corner 61, which connects the first surface 51 and the third surface 53; the second corner 62, which connects the first surface 51 and the fourth surface 54; the third corner 63, which connects the second surface 52 and the third surface 53; and the fourth corner 64, which connects the second surface 52 and the fourth surface 54. That is, each of the flow paths 50 is substantially rectangular on a plane orthogonal to the central axis AX. This allows a fluid to flow through the flow paths 50 smoothly.

Furthermore, in the present embodiment, on a plane orthogonal to the central axis AX, the first imaginary line IL1, which connects the third corner 63 and the central axis AX, coincides with the third surface 53; and the second imaginary line IL2, which connects the fourth corner 64 and the central axis AX, coincides with the fourth surface 54. Forming each of the flow paths 50 such that the third surface 53 coincides with the first imaginary line IL1 and the fourth surface 54 coincides with the second imaginary line IL2 causes the angle θ1 formed by the first surface 51 and the third surface 53 to be 90 degrees and the angle θ2 formed by the first surface 51 and the fourth surface 54 to be 90 degrees. This also causes the angle formed by the third surface 53 of the rotor core 11 and the connection region 15 of the inner surface 14 to be 90 degrees and the angle formed by the fourth surface 54 of the rotor core 11 and the connection region 15 of the inner surface 14 to be 90 degrees. Thus, a sharp portion having an acute angle is eliminated from the rotor core 11. Hence, damage to the outer surface 41 of the shaft member 40 by the rotor core 11 is prevented when connecting the shaft member 40 to the rotor core 11. Additionally, if magnetic steel sheets are die-cut when fabricating the rotor 10, there is no need for a portion having an acute angle in a die to be used for the die-cutting. A die with no acute angle can reduce the probability of the die being damaged.

Furthermore, the rotor 10 according to the present embodiment is rotated by a two-pole rotating magnetic field generated by the stator 20 of the electric motor 100. The number of magnetic fluxes generated in the two-pole stator 20 and passing through the shaft member 40 is larger than the number of magnetic fluxes generated in, for example, a four-pole or six-pole stator and passing through the shaft member 40. Forming the flow paths 50 disposed around the shaft member 40 such that expression (1) is satisfied effectively inhibits the occurrence of magnetic saturation.

Moreover, the rotor 10 according to the present embodiment includes the squirrel-cage conductor 30, which includes the rotor bars 31 and the end rings 32 connected to the rotor bars 31. The end rings 32 having increased sizes reduce secondary resistance. The secondary resistance refers to the electric resistance of the rotor 10. A reduction in secondary resistance improves the efficiency of the electric motor 100. A reduction in the diameter of the inner edge portion 32A of each of the end rings 32 in order to increase the distance from the inner edge portion 32A to the outer edge portion 32B of each of the end rings 32 in the radial direction increases the sizes of the end rings 32 and thereby reduces the secondary resistance. In the present embodiment, forming the flow paths 50 such that the conditions in expression (1) and expression (3) are satisfied achieves an increase in the size of the end rings 32 and an increase in the flow path area of the flow paths 50 while allowing the flow paths 50 to be disposed between the outer surface 41 of the shaft member 40 and the inner edge portion 32A of each of the end rings 32 on a plane orthogonal to the central axis AX. Satisfying the conditions in expression (1) and expression (3) achieves the smooth distribution of a fluid through the flow paths 50 and the inhibition of the occurrence of magnetic saturation.

Additionally, the present embodiment has been described using an induction motor as an example, although a two-pole electric motor, such as a permanent-magnet-type electric motor and a reluctance-type electric motor, can produce the effects. A single-phase induction motor including a main winding and an auxiliary winding and operable with a single-phase power supply has a small starting torque and thus can be designed to have a high magnetic flux density. Because the present invention has an effect of mitigating magnetic flux saturation due to the flow paths 50, use of a single-phase induction motor having a high magnetic flux density can produce greater effects.

Second Embodiment.

Figure 7:
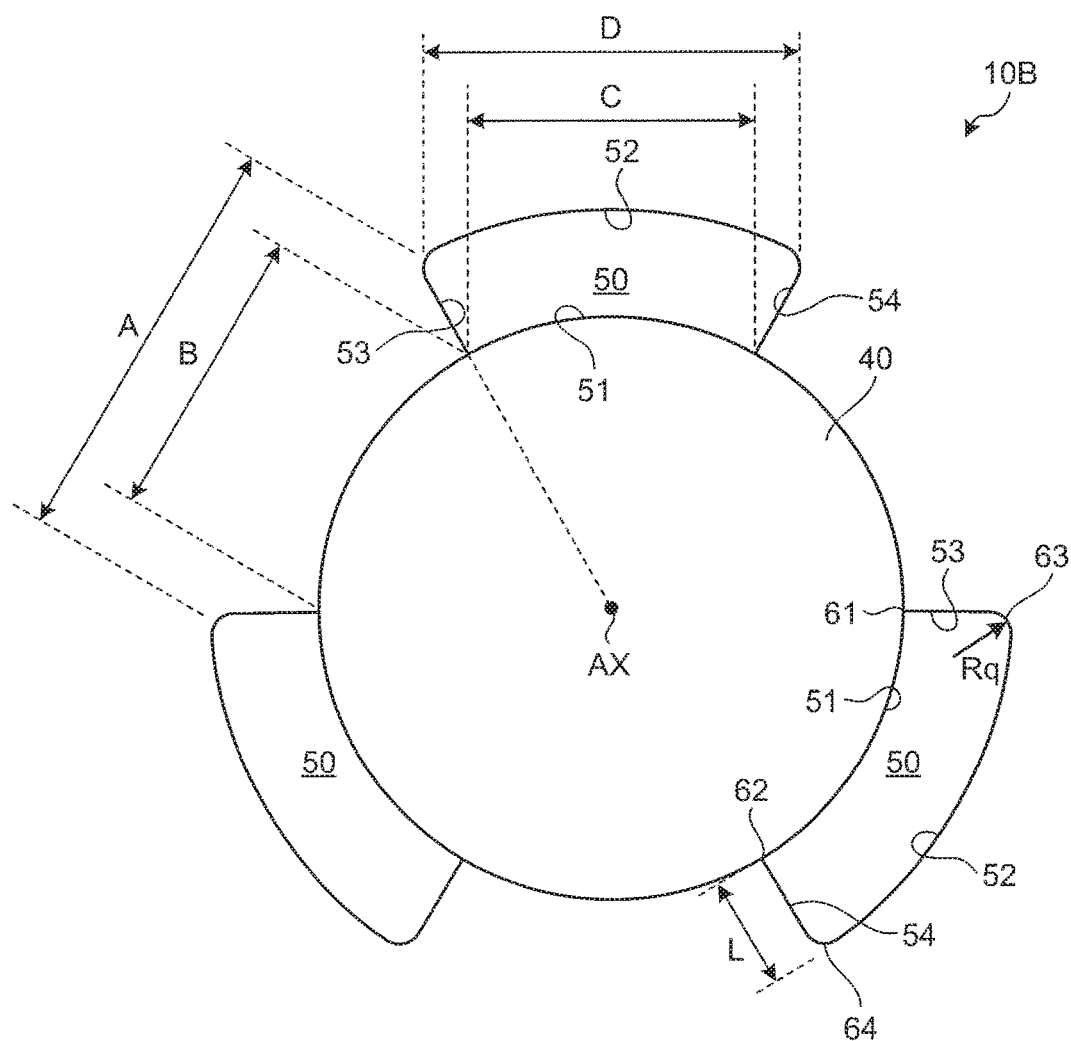
FIG. 7 is a plan view illustrating an exemplary rotor according to a second embodiment.

FIG. 7 is a diagram illustrating an exemplary rotor 10B according to a second embodiment. As illustrated in FIG. 7, the second surface 52 includes a curved surface recessed outward in the radial direction.

In the example illustrated in FIG. 7, the second surface 52 is a curved surface having its center on the central axis AX. That is, the second surface 52 is an arc on a plane orthogonal to the central axis AX. The center of curvature of the second surface 52 coincides with the central axis AX.

Because the second surface 52 of each of the flow paths 50 is a curved surface having its center on the central axis AX, the second surfaces 52 of the flow paths 50 move on an identical circular track while the rotor 10B is rotated. This allows a fluid to flow into the flow paths 50 from the first openings of the flow paths 50 smoothly and exits from the second openings of the flow paths 50 smoothly while the rotor 10B is rotated.

The inner edge portion 32A of each of the end rings 32 is also a circle concentric with the central axis AX. Concentric placement of the inner edge portion 32A of each of the end rings 32 and the second surfaces 52 can reduce the diameter of the inner edge portion 32A of each of the end rings 32 while preventing the end rings 32 and the flow paths 50 from overlapping with each other on a plane orthogonal to the central axis AX. Hence, an increase in the size of the end rings 32 and an increase in the flow path area of the flow paths 50 can be achieved.

Note that a part of the second surface 52 may be a curved surface having its center on the central axis AX. The second surface 52 may be a curved surface that is parallel with the central axis AX and has its center on an axis different from the central axis AX. The second surface 52, which may not be a curved surface having its center on the central axis AX but is a curved surface recessed outward in the radial direction, allows a fluid to flow into the flow paths 50 from the first openings of the flow paths 50 more smoothly and exit from the second openings of the flow paths 50 more smoothly than the second surface 52 that is a flat surface. The second surface 52, which may not be a curved surface having its center on the central axis AX but is a curved surface recessed outward in the radial direction, can suppress the end rings 32 and the flow paths 50 from overlapping with each other and achieve an increase in the size of the end rings 32 and an increase in the flow path area of the flow paths 50 in comparison with the second surface 52 that is a flat surface.

At least one of the first corner 61, the second corner 62, the third corner 63, and the fourth corner 64 may include a curved surface. This eliminates a portion having an acute angle from a die to be used, if applicable, for die-cutting of magnetic steel sheets when fabricating the rotor 10B. It reduces the probability of the die being damaged, allowing the rotor 10B to be fabricated smoothly.

As illustrated in FIG. 7, the third corner 63 and the fourth corner 64 may include curved surfaces. In the example illustrated in FIG. 7, the third corner 63 includes an arc and the fourth corner 64 includes an arc on a plane orthogonal to the central axis AX.

Each of the flow paths 50 satisfies the condition in expression (5).

$$Rq<L/2 \tag{5},$$

where the radius of curvature of the third corner 63 and the radius of curvature of the fourth corner 64 is Rq, and the distance from the first surface 51 to the second surface 52 in the radial direction is L. The distance L is equal to the dimension of the third surface 53 in the radial direction and the dimension of the fourth surface 54 in the radial direction.

The third corner 63 including a curved surface and the fourth corner 64 including a curved surface eliminate a portion having an acute angle from a die to be used, if applicable, for die-cutting of magnetic steel sheets when fabricating the rotor 10B. Hence, the probability of the die being damaged is reduced, which allows the rotor 10B to be fabricated smoothly.

If the radius Rq is large, it reduces the flow path areas of the flow paths 50. If the condition in expression (5) is not satisfied (if Rq≥L/2), an arc is present inward of the middle of the third surface 53 in the radial direction. The presence of an arc inward of the middle of the third surface 53 in the radial direction reduces the distance B from the first flow path 50 to the second flow path 50, which are adjacent to each other, creating a higher probability of the occurrence of magnetic saturation.

The flow paths 50 satisfying the condition in expression (5) suppress the reduction of the distance B. The occurrence of magnetic saturation is thereby inhibited.

Third Embodiment.

Figure 8:
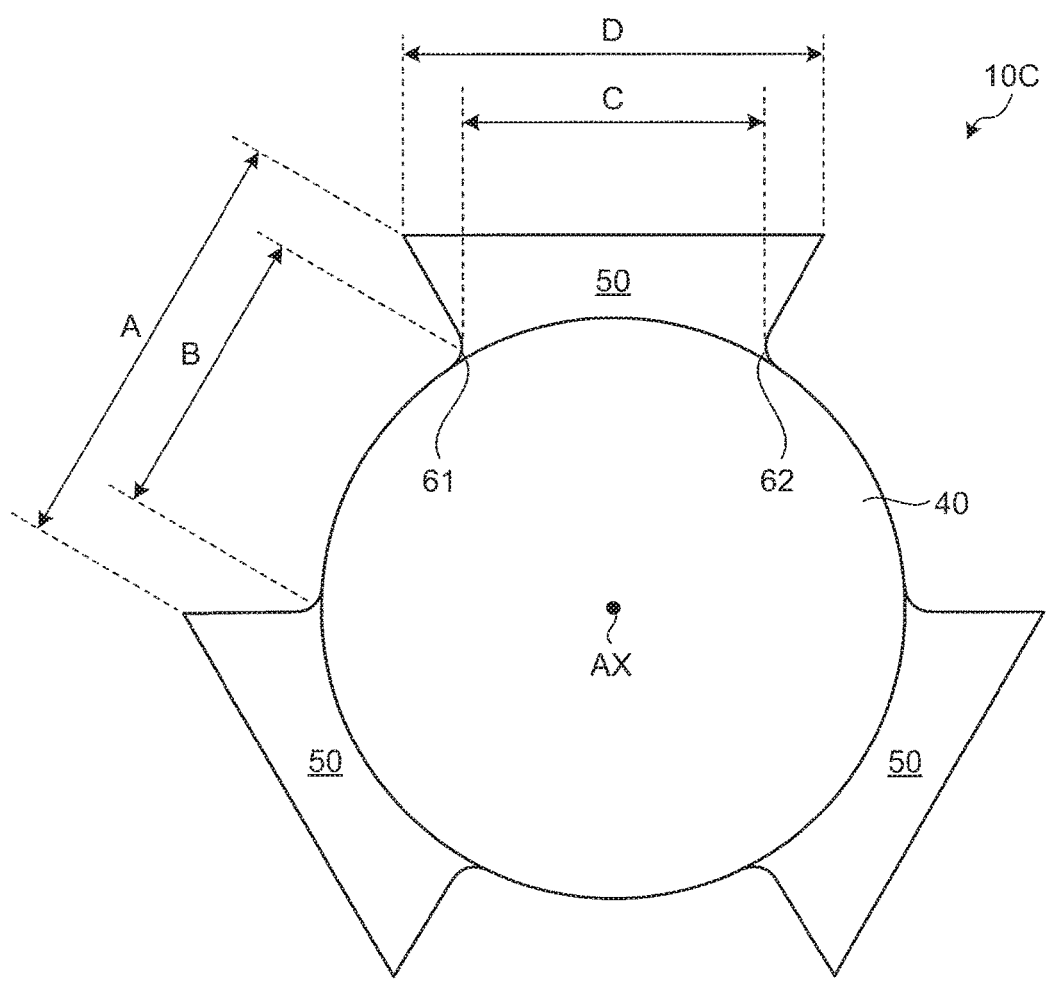
FIG. 8 is a plan view illustrating an exemplary rotor according to a third embodiment.

FIG. 8 is a diagram illustrating an exemplary rotor 10C according to a third embodiment. As illustrated in FIG. 8, the first corner 61 and the second corner 62 may include curved surfaces. In the example illustrated in FIG. 8, the first corner 61 includes an arc and the second corner 62 includes an arc on a plane orthogonal to the central axis AX.

The first corner 61 including a curved surface and the second corner 62 including a curved surface eliminate a portion having an acute angle from a die to be used, if applicable, for die-cutting of magnetic steel sheets when fabricating the rotor 10C. The absence of a portion having an acute angle in the die reduces the probability of the die being damaged. Additionally, sharpness in the first corner 61 and in the second corner 62 tends to generate burrs, which may get caught when connecting the shaft member 40 to the inner surface 14 of the shaft hole 13 by shrink fitting or press fitting. Additionally, sharpness in the first corner 61 and in the second corner 62 may cause damage to the outer surface 41 of the shaft member 40 when connecting the shaft member 40 to the rotor core 11. Roundness in the first corner 61 and the second corner 62 inhibits damage to the outer surface 41 of the shaft member 40, allowing the rotor 10C to be fabricated smoothly.

Fourth Embodiment.

Figure 9:
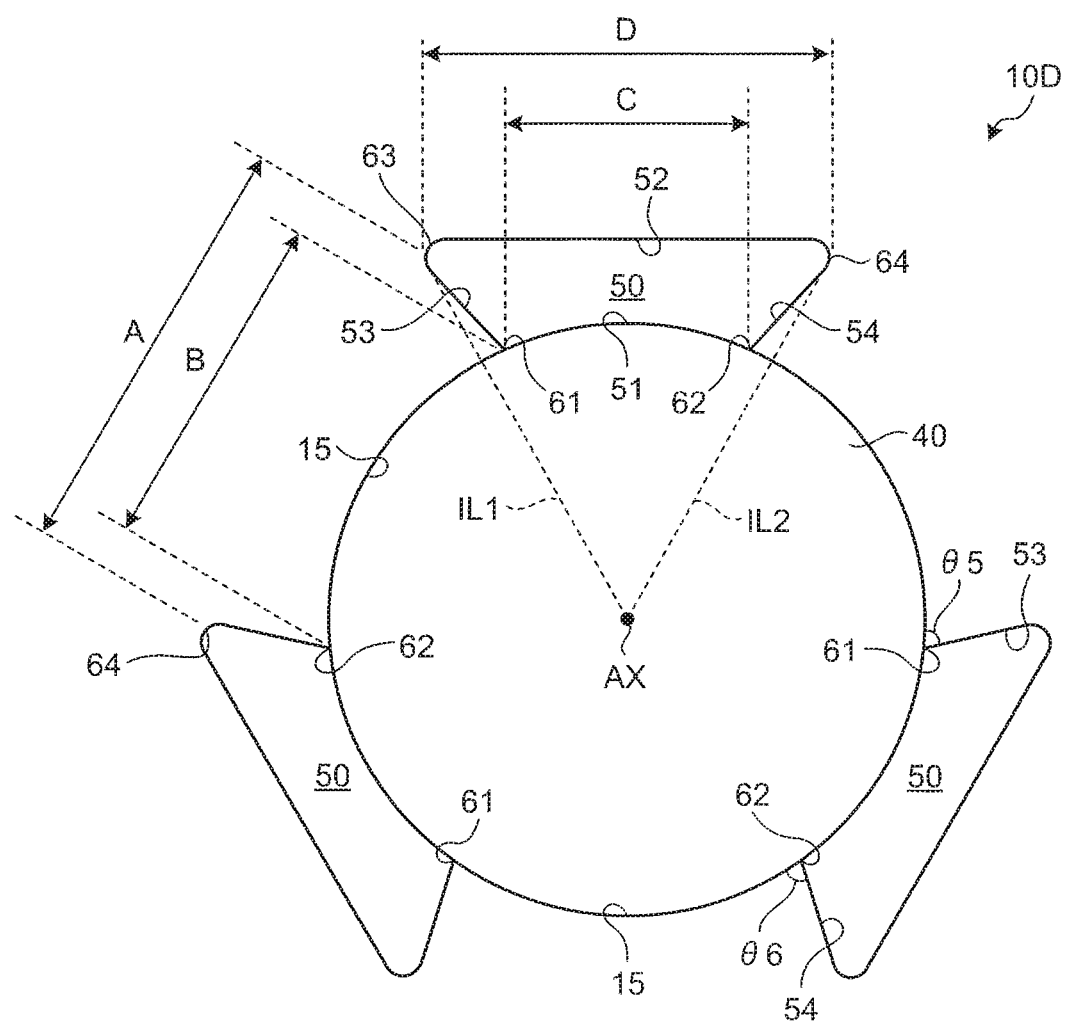
FIG. 9 is a plan view illustrating an exemplary rotor according to a fourth embodiment.

FIG. 9 is a diagram illustrating an exemplary rotor 10D according to a fourth embodiment. As illustrated in FIG. 9, on a plane orthogonal to the central axis AX, the distance C from one end of the first surface 51 to the other end of the first surface 51 in the rotational direction is determined such that the following condition is met: the first corner 61 and the second corner 62 are disposed between the first imaginary line IL1, which connects the third corner 63 and the central axis AX, and the second imaginary line IL2, which connects the fourth corner 64 and the central axis AX. The third surface 53 and the fourth surface 54 are also disposed between the first imaginary line IL1 and the second imaginary line IL2.

Placement of the first corner 61, the third surface 53, the second corner 62, and the fourth surface 54 between the first imaginary line IL1 and the second imaginary line IL2 can elongate the distance B, which is from the first corner 61 of the first flow path 50 to the second corner 62 of the second flow path 50, of the flow paths 50 that are adjacent to each other. This inhibits the occurrence of magnetic saturation.

If the distance C is reduced excessively in order to elongate the distance B, an angle θ5 formed by the third surface 53 and the connection region 15 and an angle θ6 formed by the fourth surface 54 and the connection region 15 are reduced, which may cause a portion between the third surface 53 and the connection region 15 and a portion between the fourth surface 54 and the connection region 15 to become sharp. The presence of a sharp portion in the rotor core 11 increases the probability of damaging a die to be used, if applicable, for die-cutting of magnetic steel sheets when fabricating the rotor 10D. Additionally, the strength in the portion between the third surface 53 and the connection region 15 and the portion between the fourth surface 54 and the connection region 15 may be reduced.

Hence, each of the flow paths 50 may satisfy the condition in expression (6).

$$A≥B \tag{6},$$

where the distance from the third corner 63 of the first flow path 50 of two adjacent flow paths 50 to the fourth corner 64 of the second flow path 50, which is adjacent to the first flow path 50, is A, and the distance from the first corner 61 of the first flow path 50 to the second corner 62 of the second flow path 50 is B. This allows the rotor 10D to be fabricated smoothly and inhibits the occurrence of magnetic saturation.

Fifth Embodiment.

Figure 10:
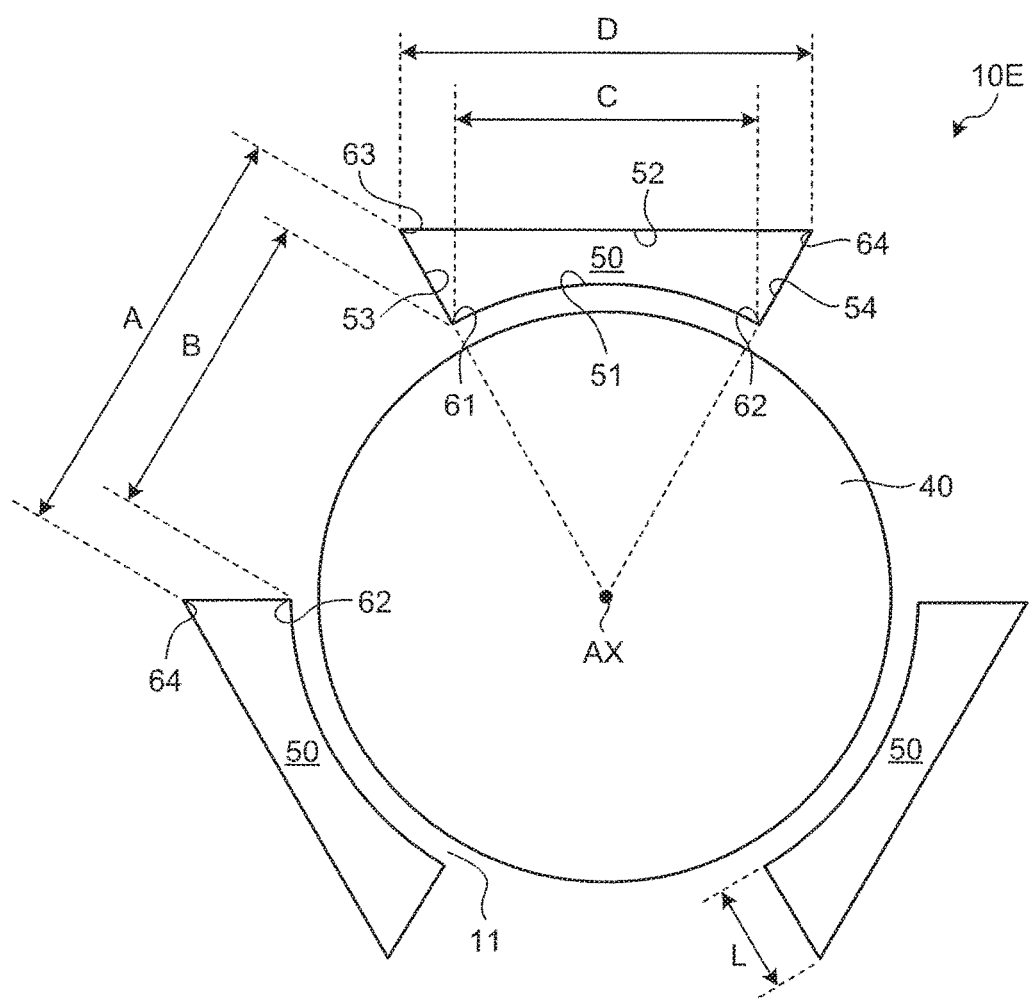
FIG. 10 is a plan view illustrating an exemplary rotor according to a fifth embodiment.

FIG. 10 is a diagram illustrating an exemplary rotor 10E according to a fifth embodiment. As illustrated in FIG. 10, a portion of the rotor core 11 may be disposed between the shaft member 40 and the flow paths 50. That is, the first surface 51, the second surface 52, the third surface 53, and the fourth surface 54 of each of the flow paths 50 may be disposed in the rotor core 11. As illustrated in FIG. 10, forming the flow paths 50 such that a condition such as in expression (1) is satisfied allows a fluid to flow through the flow paths 50 smoothly and inhibits the occurrence of magnetic saturation even if the shaft hole 13 is separated from the flow paths 50.

Sixth Embodiment.

Figure 11:
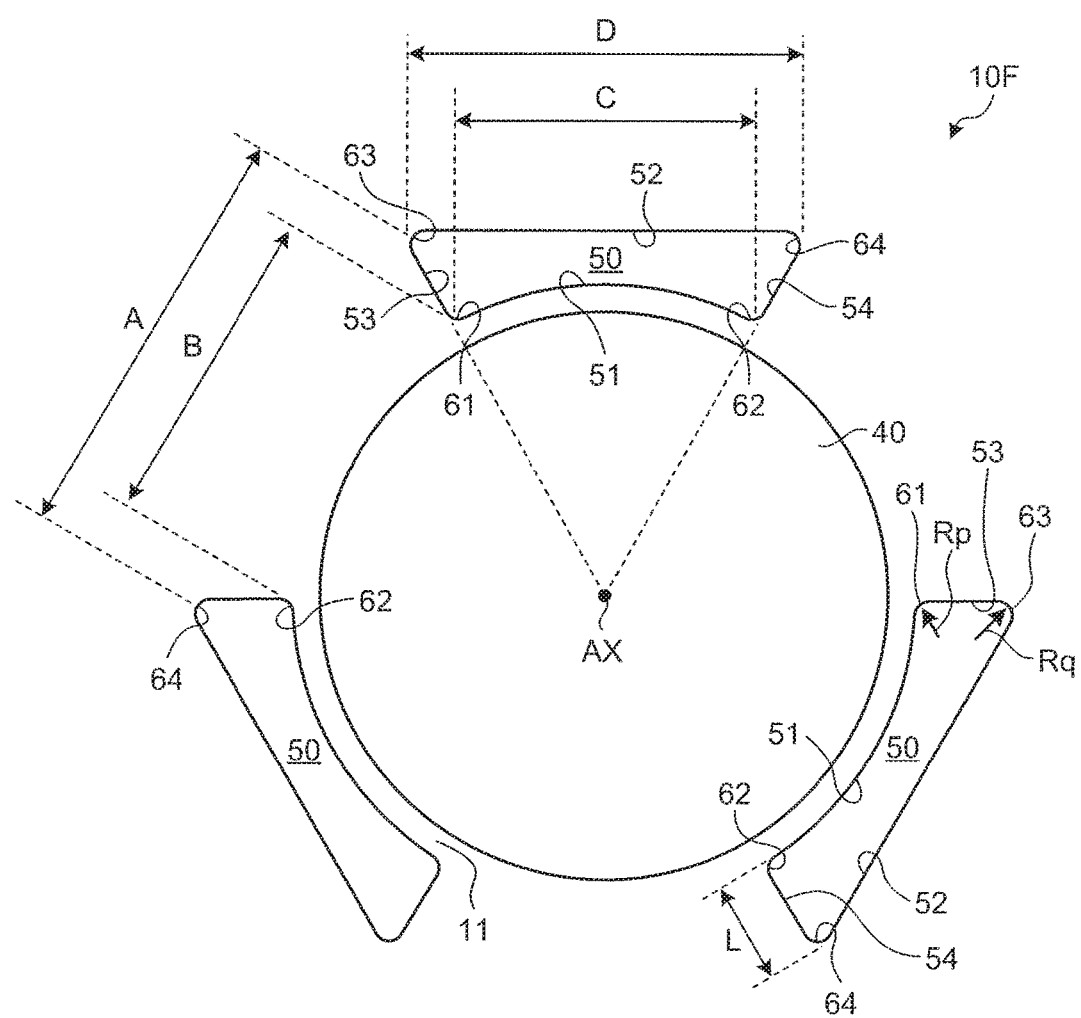
FIG. 11 is a plan view illustrating an exemplary rotor according to a sixth embodiment.

FIG. 11 is a diagram illustrating an exemplary rotor 10F according to a sixth embodiment. As illustrated in FIG. 11, the first surface 51, the second surface 52, the third surface 53, and the fourth surface 54 of each of the flow paths 50 are disposed in the rotor core 11.

The first corner 61 includes an arc and the second corner 62 includes an arc on a plane orthogonal to the central axis AX. The first corner 61 including a curved surface and the second corner 62 including a curved surface eliminate a portion having an acute angle from a die to be used, if applicable, for die-cutting of magnetic steel sheets when fabricating the rotor 10F, thereby reducing the probability of the die being damaged.

Each of the flow paths 50 satisfies the condition in expression (7).

$$Rp > L/2 \qquad (7),$$

where the radius of curvature of the first corner 61 and the radius of curvature of the second corner 62 is Rp, and the distance from the first surface 51 to the second surface 52 in the radial direction is L. The distance L is equal to the dimension of the third surface 53 and the dimension of the fourth surface 54 in the radial direction.

The flow paths 50 satisfying the condition in expression (7) inhibit the occurrence of magnetic saturation. When the condition in expression (7) is satisfied, an arc is present outward of the middle of the third surface 53 in the radial direction. The presence of an arc outward of the middle of the third surface 53 in the radial direction increases the distance from the first flow path 50 to the second flow path 50, which are adjacent to each other, thereby inhibiting the occurrence of magnetic saturation.

In the example illustrated in FIG. 11, in addition to the first corner 61 including an arc and the second corner 62 including an arc, the third corner 63 includes an arc and the fourth corner 64 includes an arc on a plane orthogonal to the central axis AX.

Each of the flow paths 50 satisfies the condition in expression (8).

$$Rq < Rp \qquad (8),$$

where the radius of curvature of the first corner 61 and the radius of curvature of the second corner 62 is Rp, and the radius of curvature of the third corner 63 and the radius of curvature of the fourth corner 64 is Rq.

When the radius Rp is large, the distance B is increased and, thus, the occurrence of magnetic saturation is inhibited. If the radius Rq is large, the distance A is increased but the effect of improving magnetic saturation is less than the case in which the distance B is increased. The flow paths 50 that satisfy the condition in expression (8) can effectively inhibit magnetic saturation while maintaining the flow path areas of the flow paths 50.

In the sixth embodiment, the first corner 61, the second corner 62, the third corner 63, and the fourth corner 64 include an arc. The first corner 61 and the second corner 62 may include an arc, and the third corner 63 and the fourth corner 64 may be square instead of including an arc. In the case in which the first corner 61 and the second corner 62 include an arc and the third corner 63 and the fourth corner 64 include no arc, satisfying the condition in expression (7) also inhibits the occurrence of magnetic saturation.

In the fifth embodiment and the sixth embodiment, the shaft hole 13 is separated from the flow paths 50. In the fifth embodiment and the sixth embodiment, each of the flow paths 50 may be defined by the shaft member 40 and the recessed portions 17 in the rotor core 11.

Seventh Embodiment.

Figure 12:
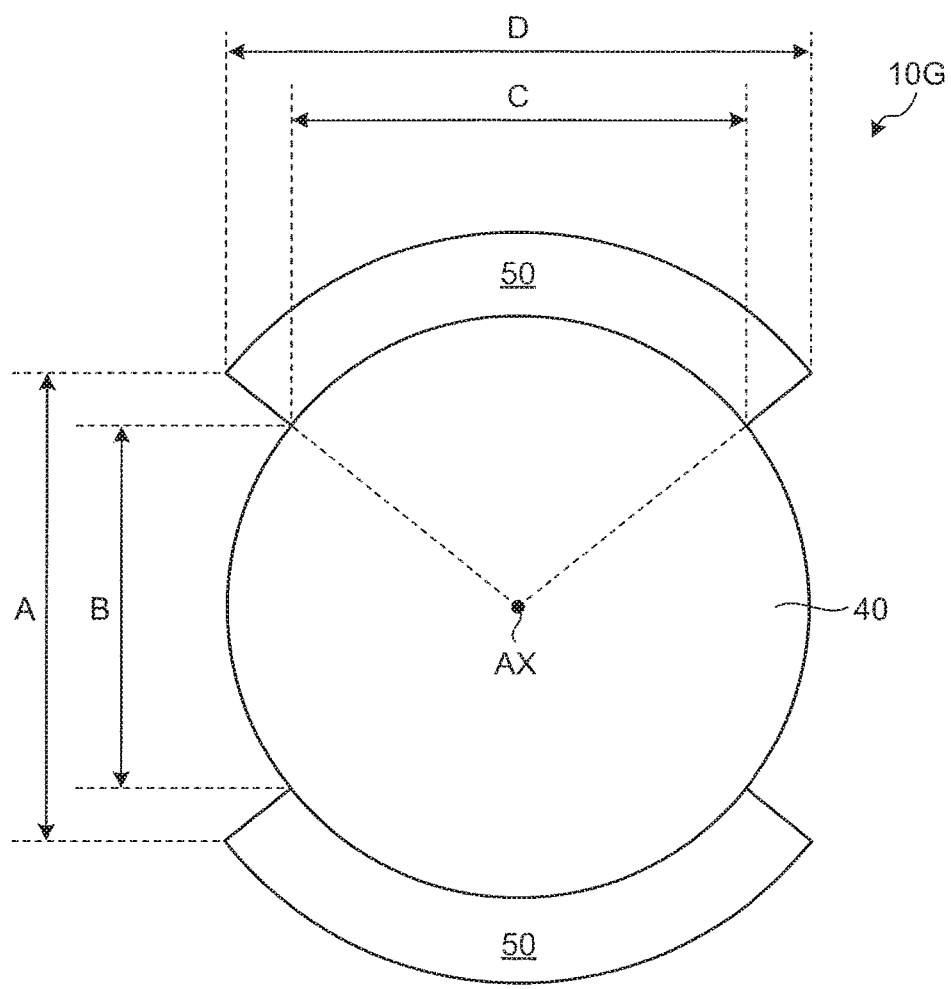
FIG. 12 is a plan view illustrating an exemplary rotor according to a seventh embodiment.

FIG. 12 is a diagram illustrating an exemplary rotor 10G according to a seventh embodiment. In the embodiments described above, the three flow paths 50 are disposed around the shaft member 40. As illustrated in FIG. 12, the number of the flow paths 50 disposed around the shaft member 40 may be two. Note that the number of the flow paths 50 disposed around the shaft member 40 may be four or five. The number of the flow paths 50 may be any number.

Eighth Embodiment.

Figure 13:
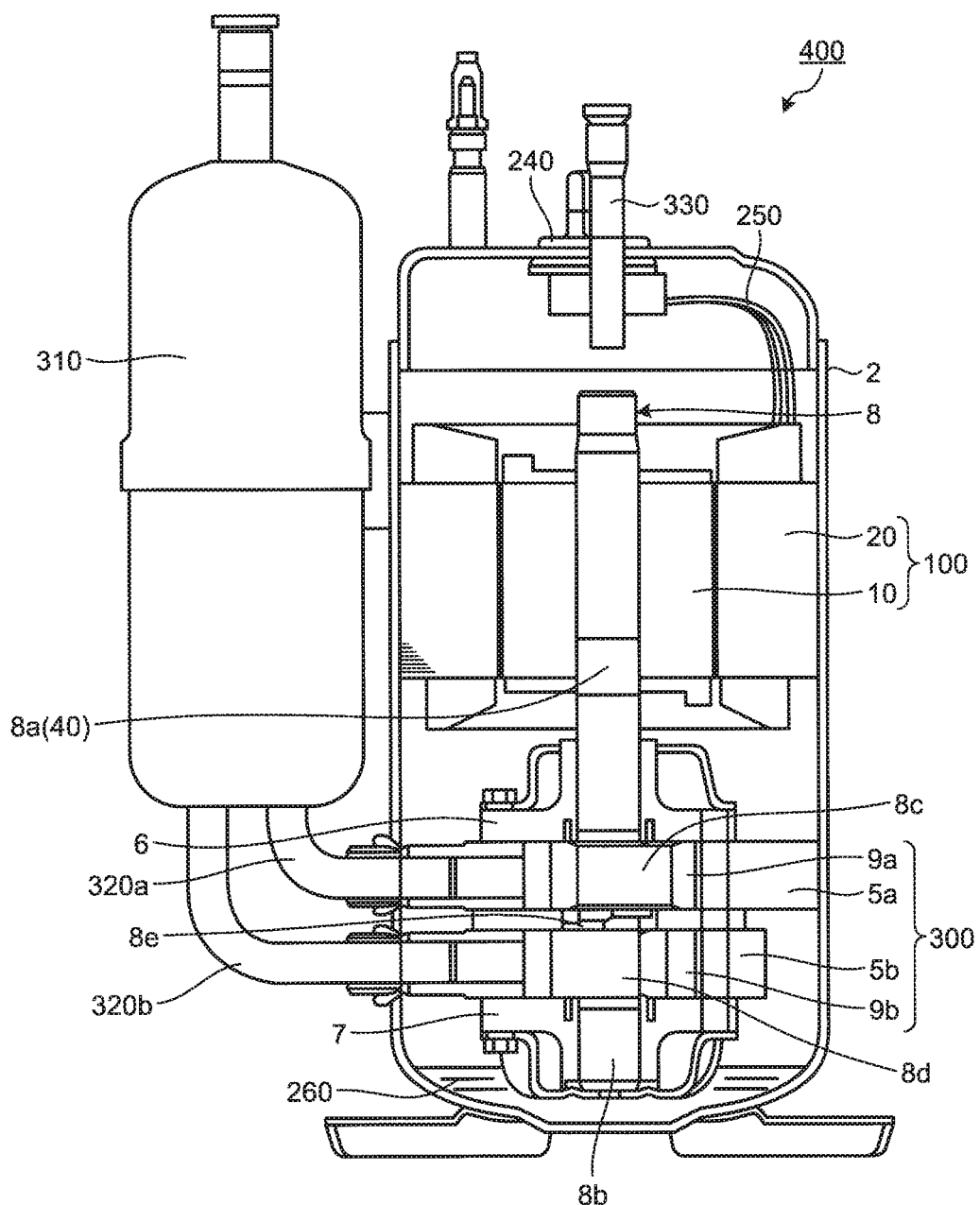
FIG. 13 is a diagram illustrating an exemplary compressor according to an eighth embodiment.

An exemplary compressor 400 according to an eighth embodiment will now be described. FIG. 13 is a diagram illustrating the exemplary compressor 400 according to the present embodiment. The compressor 400 includes the electric motor 100 according to any one of the embodiments described above.

In FIG. 13, the compressor 400 includes a sealed container 2; the electric motor 100, which is disposed in the internal space of the sealed container 2; a compressing mechanism unit 300, which is disposed in the internal space of the sealed container 2 and operates using power generated by the electric motor 100; and a shaft member 8, which transmits the power generated by the electric motor 100 to the compressing mechanism unit 300. The electric motor 100 includes the rotor 10 and the stator 20. Electric power is supplied to the electric motor 100 via a glass terminal 240 and leads 250.

The compressor 400 is a two-cylinder rotary compressor. Note that the compressor 400 may be a scroll compressor, a one-cylinder rotary compressor, a multi-stage rotary compressor, a swing rotary compressor, a vane compressor, and a reciprocating compressor.

The shaft member 8 includes a main shaft 8a fixed to the rotor 10 of the electric motor 100; a secondary shaft 8b; a main-shaft-side eccentric section 8c and a secondary-shaft-side eccentric section 8d, which are disposed between the main shaft 8a and the secondary shaft 8b; and an intermediate shaft 8e disposed between the main-shaft-side eccentric section 8c and the secondary-shaft-side eccentric section 8d. The main shaft 8a is rotatably supported by a bearing 6. The secondary shaft 8b is rotatably supported by a bearing 7. The main shaft 8a corresponds to the shaft member 40 according to any one of the embodiments described above.

The compressing mechanism unit 300 includes a first cylinder 5a; a first piston 9a disposed in the internal space of the first cylinder 5a; a second cylinder 5b; and a second piston 9b disposed in the internal space of the second cylinder 5b.

The first cylinder 5a has an inlet port, through which a gas from a refrigeration cycle is admitted to the internal space of the first cylinder 5a, and an outlet port, through which the gas in the internal space of the first cylinder 5a is discharged.

The second cylinder 5b has an inlet port, through which the gas from the refrigeration cycle is admitted to the internal space of the second cylinder 5b, and an outlet port, through which the gas in the internal space of the second cylinder 5b is discharged.

An accumulator 310 is disposed outside the sealed container 2. The first cylinder 5a is connected to the accumulator 310 via an inlet pipe 320a. The second cylinder 5b is connected to the accumulator 310 via an inlet pipe 320b.

The refrigerant gas compressed in the first cylinder 5a and the second cylinder 5b is discharged to the internal space of the sealed container 2 and supplied through an outlet pipe 330 to the refrigeration cycle of a refrigeration air conditioning system.

A lubricating oil 260 that lubricates sliding portions in the compressing mechanism unit 300 is stored at the bottom of the internal space of the sealed container 2. The lubricating oil 260 at the bottom of the sealed container 2 flows along the shaft member 8 due to the centrifugal force of the rotating shaft member 8. The lubricating oil 26 is supplied to the sliding portions in the compressing mechanism unit 300 via an oil supply hole disposed in the shaft member 8. The lubricating oil 260 is supplied to a sliding portion between the main shaft 8a and the bearing 6, a sliding portion between the main-shaft-side eccentric section 8c and the first piston 9a, a sliding portion between the secondary-shaft-side eccentric section 8d and the second piston 9b, and a sliding portion between the secondary shaft 8b and the bearing 7.

The compressor 400 includes the electric motor 100 according to any one of the embodiments described above. Hence, the efficiency of the compressor 400 can be improved. As described above, fluids such as a refrigerant and oil are present in the internal space of the sealed container 2 of the compressor 400. The fluids pass through the rotor 10. The rotor 10 has the flow paths 50 according to any one of the embodiments described above. The fluids can flow through the flow paths 50 smoothly. Additionally, the electric motor 100 inhibits the occurrence of magnetic saturation. This achieves improved efficiency of the electric motor 100 and the compressor 400.

Ninth Embodiment.

Figure 14:
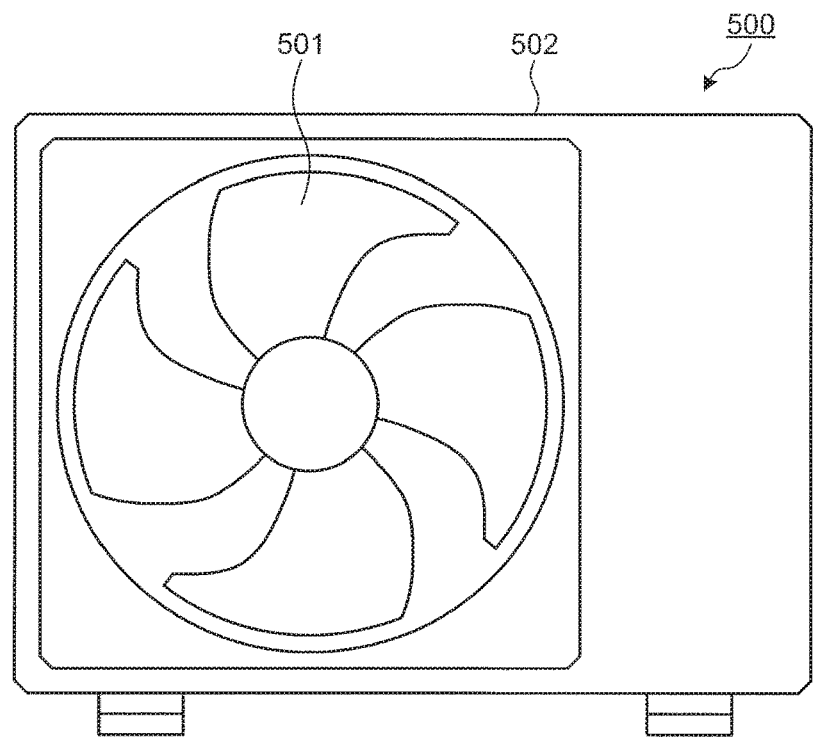
FIG. 14 is a diagram illustrating an exemplary blower according to a ninth embodiment.
Figure 15:
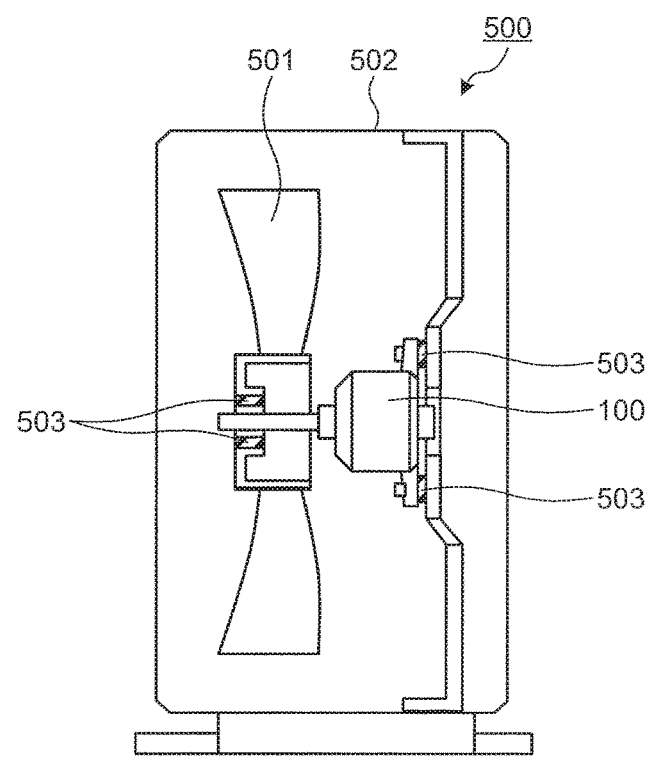
FIG. 15 is a diagram illustrating the exemplary blower according to the ninth embodiment.

An exemplary blower 500 according to a ninth embodiment will now be described. FIGS. 14 and 15 are diagrams illustrating the exemplary blower 500 according to the present embodiment. The blower 500 includes the electric motor 100 according to any one of the embodiments described above. In the example illustrated in FIGS. 14 and 15, the blower 500 includes an outdoor unit of an air conditioner.

The electric motor 100 drives a fan 501. The electric motor 100 and the fan 501 are disposed in the internal space of a housing 502. The fan 501 operates using power generated by the electric motor 100. In the example illustrated in FIGS. 14 and 15, vibration-isolating materials 503 are disposed at a connection between the fan 501 and the output shaft of the electric motor 100 and at a connection between the electric motor 100 and the housing 502.

The blower 500 includes the electric motor 100 according to any one of the embodiments described above. Hence, the efficiency of the blower 500 can be improved.

Tenth Embodiment.

Figure 16:
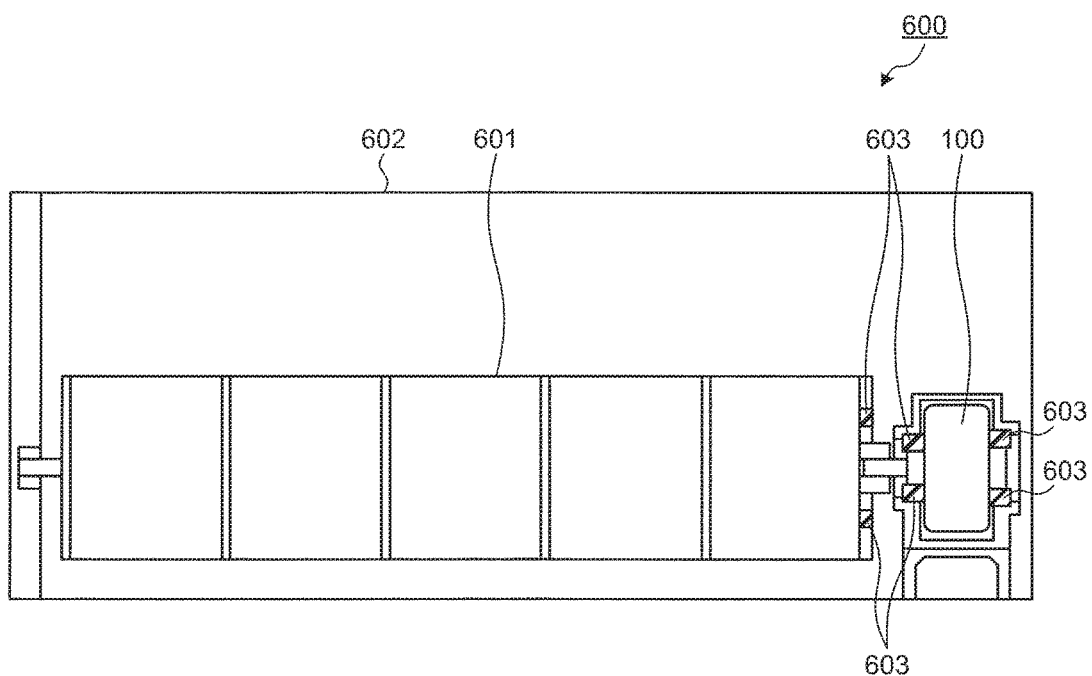
FIG. 16 is a diagram illustrating an exemplary blower according to a tenth embodiment.

An exemplary blower 600 according to a tenth embodiment will now be described. FIG. 16 is a diagram illustrating the exemplary blower 600 according to the present embodiment. The blower 600 includes the electric motor 100 according to any one of the embodiments described above. In the example illustrated in FIG. 16, the blower 600 includes an indoor unit of an air conditioner.

The electric motor 100 drives a fan 601. The electric motor 100 and the fan 601 are disposed in the internal space of a housing 602. The fan 601 operates using power generated by the electric motor 100. In the example illustrated in FIG. 16, vibration-isolating materials 603 are disposed at a connection between the fan 601 and the output shaft of the electric motor 100 and at a connection between the electric motor 100 and the housing 602.

The blower 600 includes the electric motor 100 according to any one of the embodiments described above. Hence, the efficiency of the blower 600 can be improved.

In the examples according to the embodiments described above, the electric motor 100 is an induction motor. The rotor 10 of an induction motor includes the rotor core 11 and the squirrel-cage conductor 30. The electric motor 100 may be a synchronous motor. The rotor for a synchronous motor includes permanent magnets. In a synchronous motor, the rotor is disposed around a shaft member and has a tubular member connected to an outer surface of the shaft member. The rotor for a synchronous motor may have the flow paths 50 according to any one of the embodiments described above.

Note that the components in any one of the embodiments described above may be combined as appropriate. Some of the components may be excluded.

INDUSTRIAL APPLICABILITY

The present invention is useful for a rotor for an electric motor, an electric motor including a rotor, and a compressor and a blower including an electric motor.

The invention claimed is:

1. A rotor that is connected to a shaft member, rotates about a central axis, and is used for an electric motor, the rotor comprising:
 a tubular member having a shaft hole in which at least a part of the shaft member is arranged to rotate about the central axis; and
 a plurality of flow paths positioned around the shaft member and penetrating the rotor in a direction parallel with the central axis, wherein
 each of the flow paths has an inner surface including:
  a first surface that is a portion of an outer surface of the shaft member;
  a second surface positioned outwardly from the first surface in a radial direction and facing the first surface with a clearance between the first surface and the second surface, the second surface being a flat surface;
  a third surface connecting one end of the first surface and one end of the second surface in a rotational direction about the central axis; and
  a fourth surface connecting another end of the first surface and another end of the second surface in the rotational direction,
 each of the flow paths includes:
  a first corner connecting the first surface and the third surface;
  a second corner connecting the first surface and the fourth surface;
  a third corner connecting the second surface and the third surface; and
  a fourth corner connecting the second surface and the fourth surface,
 the shaft hole has an inner surface including: a connection region connected to the outer surface of the shaft member; and a non-connection region that includes the second surface, the third surface and the fourth surface,
 a condition C<D is satisfied, where a distance from the one end of the first surface to the another end of the first surface is C, and a distance from the one end of the second surface to the another end of the second surface is D, the first corner includes a curved surface extending from a border of the connection region of the tubular member toward the third surface of the non-connection region, and the second corner includes a curved surface extending from the border of the connection region of the tubular member toward the fourth surface of the non-connection region.

2. The rotor according to claim 1, wherein a condition L<C is satisfied, where a distance from the first surface to the second surface in the radial direction is L.

3. The rotor according to claim 1, wherein a condition A≥B is satisfied, where a distance from the third corner of a first flow path to the fourth corner of a second flow path is A, the first flow path being one of the flow paths, the second flow path being another of the flow paths and being adjacent to the first flow path, and a distance from the first corner of the first flow path to the second corner of the second flow path is B.

4. The rotor according to claim 1, wherein, on a plane orthogonal to the central axis, a first imaginary line connecting the third corner and the central axis coincides with the third surface, and a second imaginary line connecting the fourth corner and the central axis coincides with the fourth surface.

5. The rotor according to claim 1, wherein
the tubular member is a rotor core positioned around the shaft member and connected to the outer surface of the shaft member, and
the rotor further comprises a squirrel-cage conductor comprising:
a nonmagnetic and conductive rotor bar located in a slot of the rotor core; and
an end ring connected to the rotor bar.

6. The rotor according to claim 1, wherein the electric motor is a single-phase induction motor.

7. The rotor according to claim 1 wherein the rotor is rotated by a two-pole rotating magnetic field generated by a stator of the electric motor.

8. An electric motor comprising:
a stator that generates a rotating magnetic field; and
a rotor according to claim 1 that is rotated by the rotating magnetic field of the stator.

9. A compressor comprising the electric motor according to claim 8.

10. A blower comprising the electric motor according to claim 8.

11. A rotor that is connected to a shaft member, rotates about a central axis, and is used for an electric motor, the rotor comprising:
a tubular member having a shaft hole coaxial with the central axis, at least a part of the shaft member being arranged to rotate about the central axis; and
a plurality of flow paths positioned between the shaft member and the tubular member and extending in a direction parallel with the central axis and penetrating the rotor, wherein
each of the flow paths has an inner surface including:
a first surface that is a portion of an outer surface of the shaft member;
a second surface positioned outwardly from the first surface in the radial direction and facing the first surface with a clearance between the first surface and the second surface;
a third surface connecting one end of the first surface and one end of the second surface in a rotational direction about the central axis; and
a fourth surface connecting another end of the first surface and another end of the second surface in the rotational direction,
each of the flow paths includes:
a first corner connecting the first surface and the third surface;
a second corner connecting the first surface and the fourth surface;
a third corner connecting the second surface and the third surface; and
a fourth corner connecting the second surface and the fourth surface,
the shaft hole has an inner surface including a connection region connected to the outer surface of the shaft member and a non-connection region that includes the second surface, the third surface, and the fourth surface,
a condition C<D is satisfied, where a distance from the one end of the first surface to the another end of the first surface is C, and a distance from the one end of the second surface to the another end of the second surface is D,
the first corner extends from a border of the connection region of the tubular member toward the third surface of the non-connection region,
the second corner extends from the border of the connection region of the tubular member toward the fourth surface of the non-connection region, and
on a plane orthogonal to the central axis, a first imaginary line connecting the third corner and the central axis coincides with the third surface, and a second imaginary line connecting the fourth corner and the central axis coincides with the fourth surface.

12. The rotor according to claim 11, wherein the second surface includes a curved surface recessed outward in the radial direction.

13. The rotor according to claim 11, wherein the second surface includes a curved surface having a center on the central axis.

14. The rotor according to claim 11, wherein, on the plane orthogonal to the central axis, a distance from the one end of the first surface to the another end of the first surface is determined such that a condition is satisfied where the first corner and the second corner are located between the first imaginary line and the second imaginary line.

15. The rotor according to claim 11, wherein each of the first corner and the second corner includes a curved surface.

16. The rotor according to claim 11, wherein a condition L<C is satisfied, where a distance from the first surface to the second surface in the radial direction is L.

17. The rotor according to claim 11, wherein, a condition A≥B is satisfied, where a distance from the third corner of a first flow path to the fourth corner of a second flow path is A, the first flow path being one of the flow paths, the second flow path being another of the flow paths and being adjacent to the first flow path, and a distance from the first corner of the first flow path to the second corner of the second flow path is B.

18. The rotor according to claim 11, wherein
the tubular member is a rotor core positioned around the shaft member and connected to the outer surface of the shaft member, and the rotor further comprises a squirrel-cage conductor comprising:
- a nonmagnetic and conductive rotor bar located in a slot of the rotor core; and
- an end ring connected to the rotor bar.

19. A rotor that is connected to a shaft member, rotates about a central axis, and contained and used within a single-phase induction electric motor, the rotor comprising:
- a tubular member having a shaft hole in which at least a part of the shaft member is arranged to rotate about the central axis; and
- a plurality of flow paths positioned around the shaft member and penetrating the rotor in a direction parallel with the central axis, wherein each of the flow paths has an inner surface including:
- a first surface that is a portion of an outer surface of the shaft member;
- a second surface positioned outwardly from the first surface in a radial direction and facing the first surface with a clearance between the first surface and the second surface;
- a third surface connecting one end of the first surface and one end of the second surface in a rotational direction about the central axis; and
- a fourth surface connecting another end of the first surface and another end of the second surface in the rotational direction, each of the flow paths includes:
- a first corner connecting the first surface and the third surface;
- a second corner connecting the first surface and the fourth surface;
- a third corner connecting the second surface and the third surface; and
- a fourth corner connecting the second surface and the fourth surface, the shaft hole has an inner surface including: a connection region connected to the outer surface of the shaft member; and a non-connection region that includes the second surface, the third surface and the fourth surface, a condition $C<D$ is satisfied, where a distance from the one end of the first surface to the another end of the first surface is C, and a distance from the one end of the second surface to the another end of the second surface is D, the first corner includes a curved surface extending from a border of the connection region of the tubular member toward the third surface of the non-connection region, and the second corner includes a curved surface extending from the border of the connection region of the tubular member toward the fourth surface of the non-connection region.

* * * * *